US012180882B2

(12) United States Patent
Favaretto (10) Patent No.: US 12,180,882 B2
(45) Date of Patent: Dec. 31, 2024

(54) PROPULSION ASSEMBLY FOR A MOTOR VEHICLE

(71) Applicant: FERRARI S.P.A., Modena (IT)

(72) Inventor: Fabrizio Favaretto, Modena (IT)

(73) Assignee: FERRARI S.P.A., Modena (IT)

( * ) Notice: Subject to any disclaimer, the term of this patent is extended or adjusted under 35 U.S.C. 154(b) by 0 days.

(21) Appl. No.: 18/409,579

(22) Filed: Jan. 10, 2024

(65) Prior Publication Data
US 2024/0240585 A1     Jul. 18, 2024

(30) Foreign Application Priority Data

Jan. 17, 2023   (IT) ................. 102023000000531

(51) Int. Cl.
F02B 37/10       (2006.01)

(52) U.S. Cl.
CPC .................... F02B 37/10 (2013.01)

(58) Field of Classification Search
CPC .... F02B 33/32–42; F02B 37/04; F02B 37/10; F02B 37/14; F02B 37/16; F02B 39/04; F02B 39/12; F02B 29/04; F02B 67/10; B60K 17/00; B60K 13/02
See application file for complete search history.

(56) References Cited

U.S. PATENT DOCUMENTS

| | | | |
|---|---|---|---|
| 5,890,468 A * | 4/1999 | Ozawa | F02B 33/32 123/561 |
| 6,446,592 B1 | 9/2002 | Wilksch | |
| 6,536,382 B1 | 3/2003 | Wilksch | |
| 11,480,098 B1 * | 10/2022 | Al-Huwaider | B60K 17/04 |
| 2014/0260244 A1 * | 9/2014 | Son | F02B 39/04 123/559.3 |
| 2017/0226940 A1 * | 8/2017 | Sun | F02B 37/14 |

FOREIGN PATENT DOCUMENTS

GB      2348670 A     10/2000

OTHER PUBLICATIONS

Search Report issued in Italian Application No. 102023000000531.

* cited by examiner

*Primary Examiner* — Loren C Edwards
(74) *Attorney, Agent, or Firm* — The Belles Group P.C.

(57) ABSTRACT

A propulsion assembly for a motor vehicle with an internal combustion engine comprising at least one movable member, a turbocharger comprising a turbine adapted to expand exhaust gases to generate work and a first compressor adapted to compress air by means of the work generated by the turbine, an intake line connecting an outlet of the first compressor to an intake manifold of said engine to supply compressed air from the first compressor to said engine, wherein the intake line comprises a second compressor, which in turn comprises a compressor shaft rotatable about a first axis and is configured to further compress the compressed air from the first compressor via a rotation of the compressor shaft. The propulsion assembly further comprises mechanical transmission means configured to couple the movable member to the compressor shaft, thereby determining a transmission of motion from the movable member to the compressor shaft.

14 Claims, 6 Drawing Sheets

PROPULSION ASSEMBLY FOR A MOTOR VEHICLE

CROSS-REFERENCE TO RELATED APPLICATIONS

This patent application claims priority from Italian patent application no. 102023000000531, filed on Jan. 17, 2023. The entire disclosure of the aforementioned priority application is incorporated herein by reference in its entirety.

TECHNICAL FIELD

The invention concerns a propulsion assembly for a motor vehicle, in particular comprising an internal combustion engine supercharged by means of a turbocharger.

BRIEF SUMMARY

Many motor vehicles are known for having a propulsion assembly with an internal combustion engine supercharged by means of a turbocharger. In particular, the turbocharger often has significant dimensions when the engine is configured to deliver relatively high powers.

In this specific case, but also more generally, the turbocharger results in inefficiencies, for example when the engine operates at minimum speed. In fact, when the engine revolutions are low or tend towards minimum, the available enthalpy of the exhaust gases is not sufficient for optimal supercharging of the engine. In this context, the need is felt to improve the known propulsion assemblies, in particular in terms of optimizing supercharging of the internal combustion engine.

An object of the invention is to meet the above need, preferably in a simple reliable manner. The object is achieved by a propulsion assembly for a motor vehicle, as defined in claim 1. The dependent claims define particular embodiments of the invention.

BRIEF DESCRIPTION OF THE DRAWINGS

Below, an embodiment of the invention is described for a better understanding thereof by way of non-limiting example and with reference to the attached drawings, in which.

DETAILED DESCRIPTION

Figure 1:
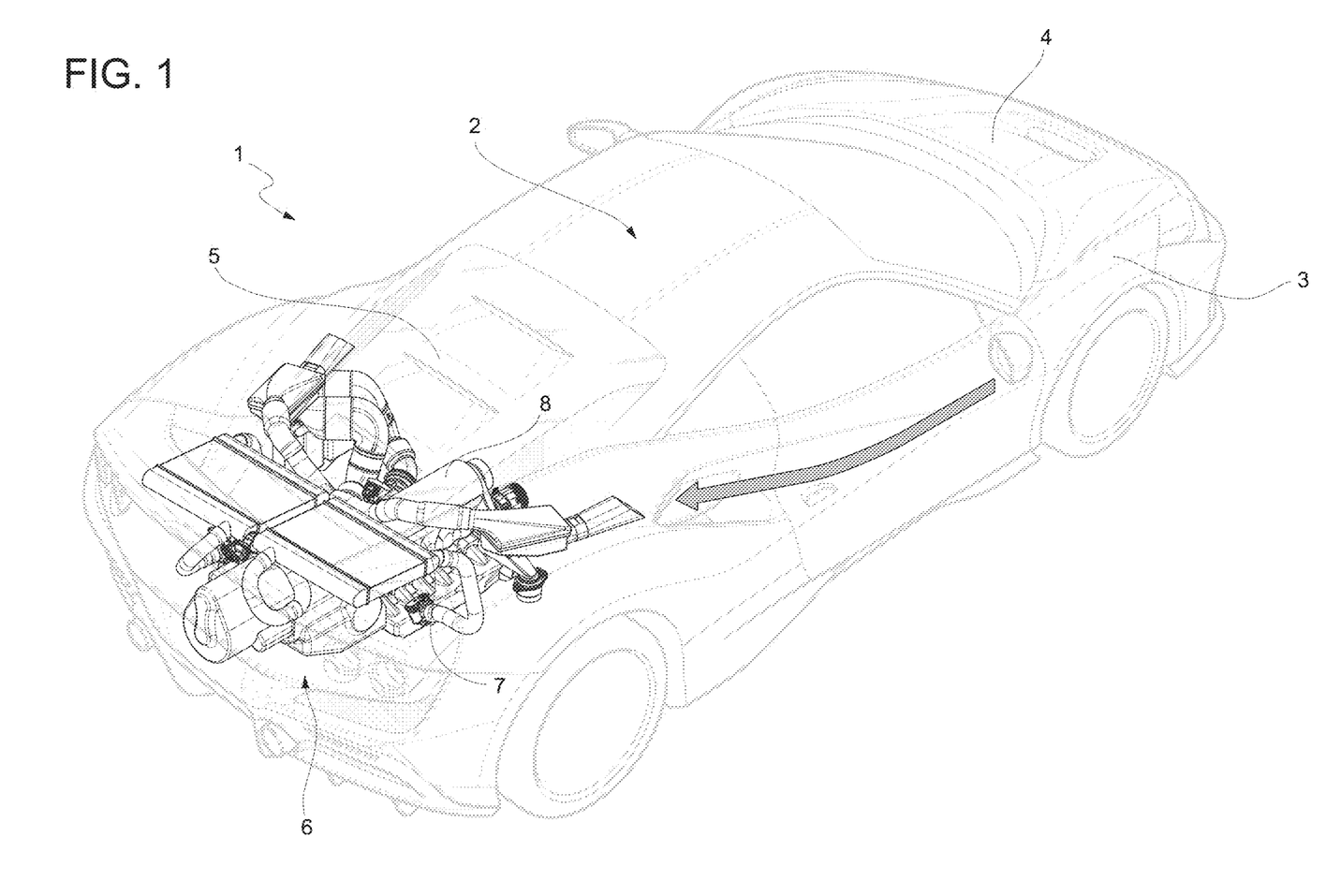
FIG. 1 is a perspective view of a motor vehicle comprising a propulsion assembly according to the invention.
Figure 2:
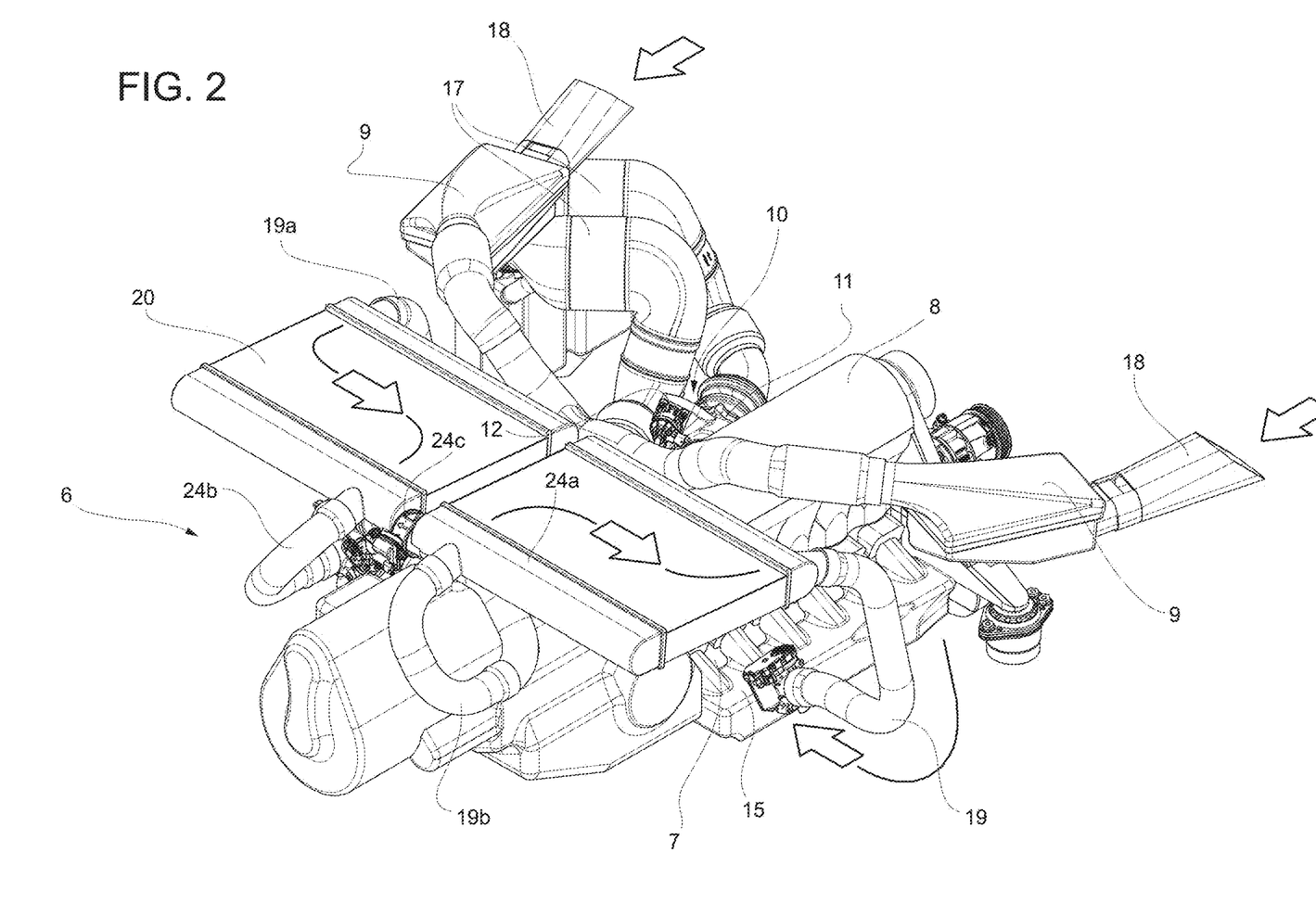
FIGS. 2 and 3 are perspective views, on an enlarged scale, of the propulsion assembly from different points of view.
Figure 3:
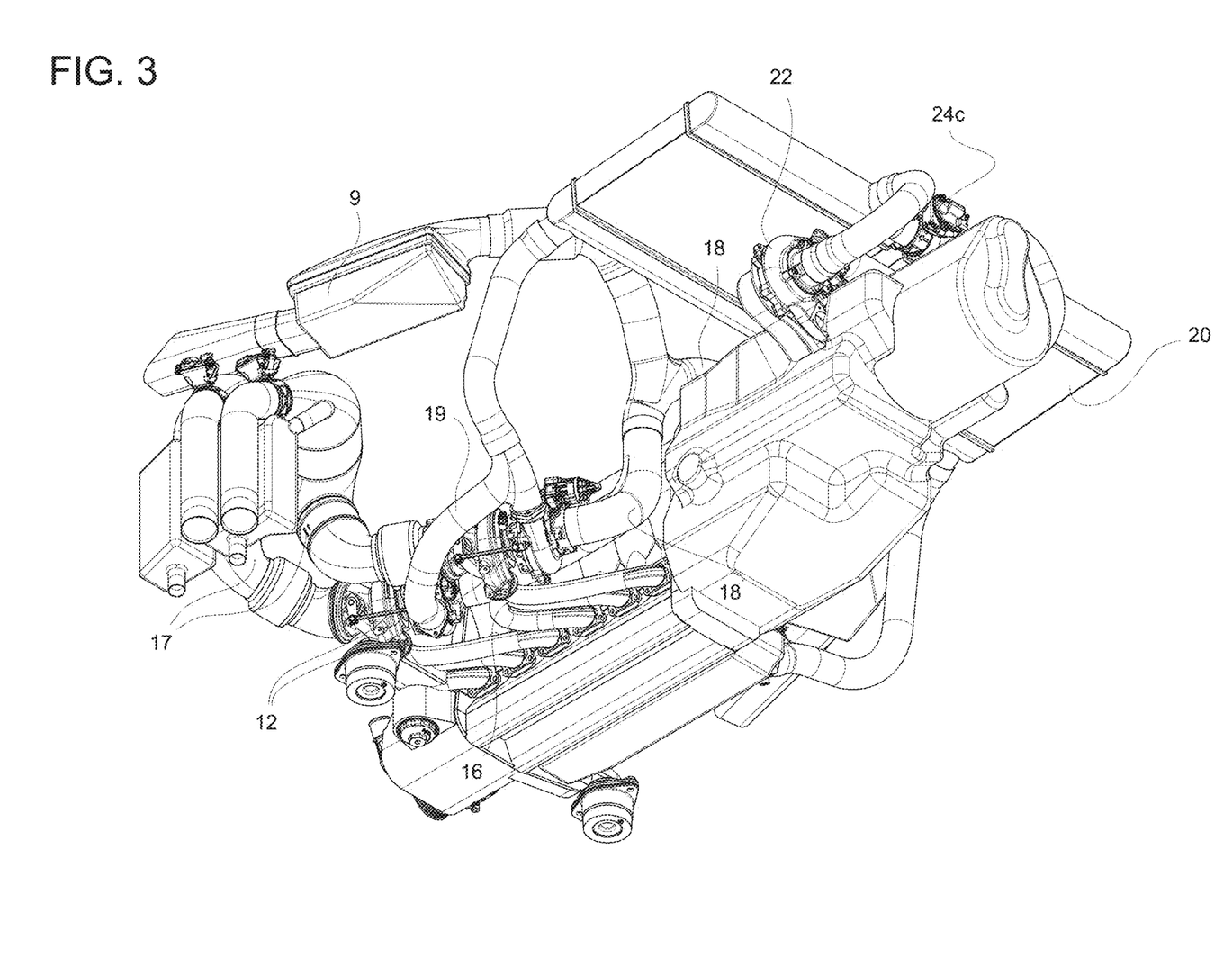
Figure 4:
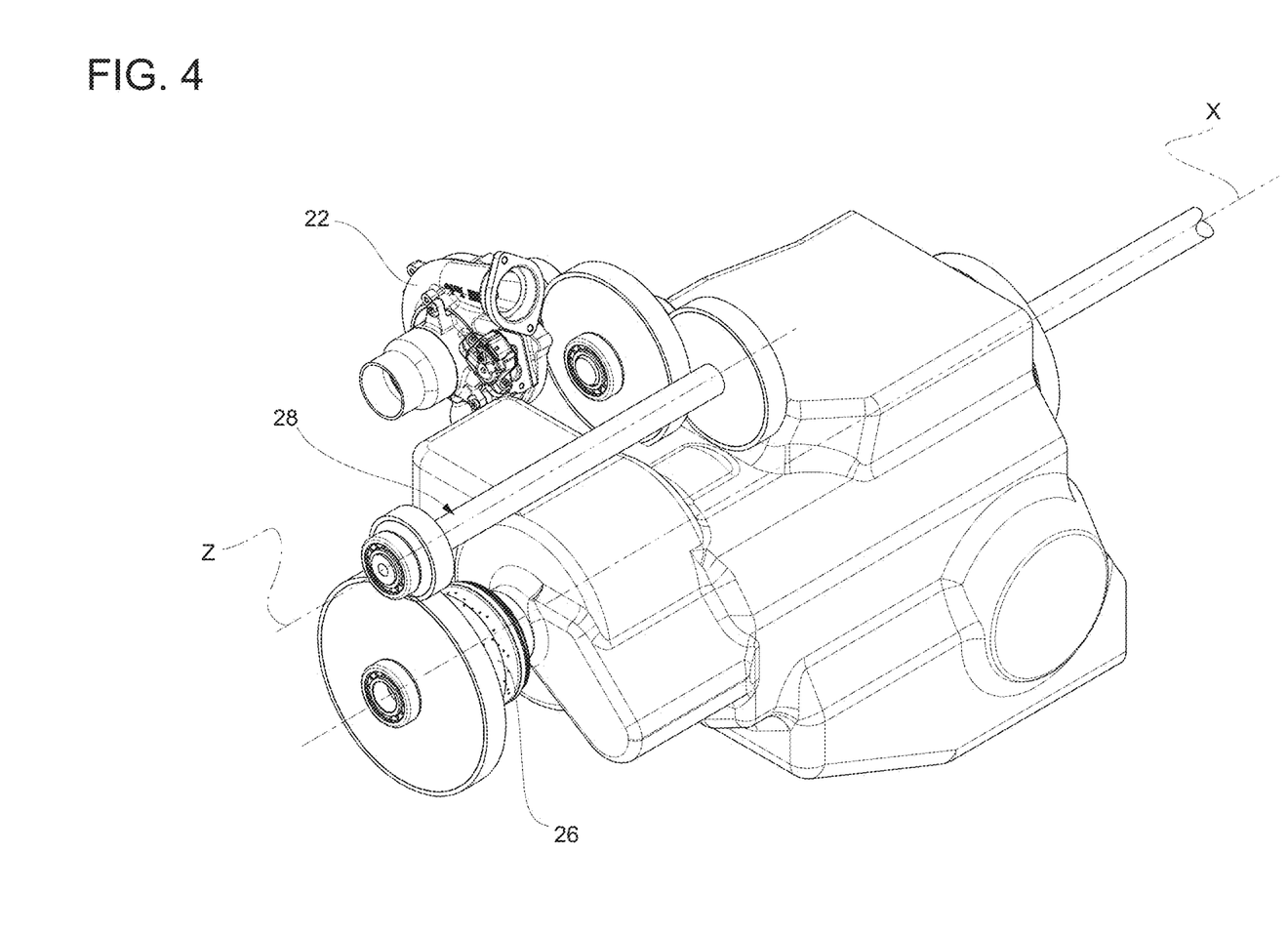
FIGS. 4 and 5 are perspective views, on respective enlarged scales, of a detail of the propulsion assembly according to opposite points of view.

In FIG. 1, the reference number 1 is used to indicate, overall, a vehicle, specifically a motor vehicle, in particular a sports or racing vehicle. The motor vehicle 1 comprises a body 2, in turn including a frame not illustrated and a bodywork 3, externally visible in FIG. 1. The motor vehicle 1 has direction of travel, which allows the body 2 to be conceptually divided into a front portion 4, in front of a passenger compartment of the motor vehicle 1, and a rear portion 5 behind the passenger compartment. The motor vehicle 1 further comprises an internal combustion engine 6, in turn comprising a cylinder head 7 and a crankcase 8. In the non-limiting embodiment illustrated, the engine 6 is optionally arranged at the rear portion 5.

In further detail, the cylinder head 7 faces downwards. Consequently, the crankcase 8 is arranged above the cylinder head 7. In other words, the engine 6 has a reverse configuration with respect to the usual configuration in the known motor vehicles. This allows, for example, the positioning of a plurality of auxiliary devices above the engine 6 to assist the operation of said engine.

The body 2 defines a compartment having, above the engine 6, a greater available volume than a volume of said compartment below the engine 6. In this way, the positioning of the auxiliary devices above the engine 6 or cylinder head 7 represents an optimal use of the available volumes defined by the body 2.

The engine 6 forms part of a propulsion assembly for the motor vehicle 1. The assembly can comprise, for example, the auxiliary devices and can clearly form part of the motor vehicle 1 itself, although it could also be supplied separately. In addition to the engine 6, the assembly further comprises one or more turbochargers 10. In the specific example illustrated, the assembly comprises two separate turbochargers 10. Preferably, one or both the turbochargers 10 are arranged above or higher than the cylinder head 7 and/or the engine 6. The term above should be understood as located in a position having a greater height.

Each of the turbochargers 10 comprises a turbine 11 adapted to expand exhaust gases of the engine 6, thus generating work, and a compressor 12 adapted to compress air by means of the work generated by the turbine 11. More precisely, the compressor 12 comprises a compressor shaft not illustrated, rotatable around its own axis and coupled to the turbine 11.

The work of the turbine 11 causes rotation of the compressor shaft, via which the compressor 12 compresses the air. In particular, the compressor shaft is also a shaft of the turbine 11, as is normally the case in the known turbochargers, although this is not necessary.

The compressor 12 comprises at least an impeller not illustrated and fitted on the compressor shaft. Similarly, the turbine 11 comprises a rotor not illustrated and fitted on said compressor shaft. Therefore, the expansion of the exhaust gases in the turbine 11 entails rotation of the rotor of the turbine 11 and therefore of the compressor shaft, which in turn causes rotation of the impeller of the compressor 12, which is configured to compress the air entering the compressor 12.

In further detail, the engine 6 comprises an intake manifold 15, via which the engine 6 sucks in air to be mixed with fuel, and an exhaust manifold 16, via which the engine 6 discharges the exhaust gases produced by the combustion.

Each turbine 11 has a corresponding intake for the exhaust gases to be expanded communicating with the exhaust manifold 16 by means of an exhaust line or duct 17. Furthermore, the turbine 11 has an outlet for the expanded exhaust gases communicating with an outlet of the motor vehicle 1 in a manner not illustrated.

The exhaust line 17 is part of the propulsion assembly. Furthermore, each compressor 12 has a corresponding intake for the air to be compressed communicating with the outside via a supply line or duct 18. The supply line 18 preferably comprises an air filter 9. Similarly, each compressor 12 has an outlet for the compressed air.

The propulsion assembly further comprises an intake line 19 that connects or establishes communication between the outlet of the compressor 12 and the intake manifold 15 to supply the compressed air from the compressor 12 to the engine 6.

The intake line 19 preferably comprises an intercooler 20. To deliver power or more simply for its operation, the engine 6 comprises a plurality of movable members, for example members belonging to the so-called distribution apparatus of the engine 6.

Figure 5:
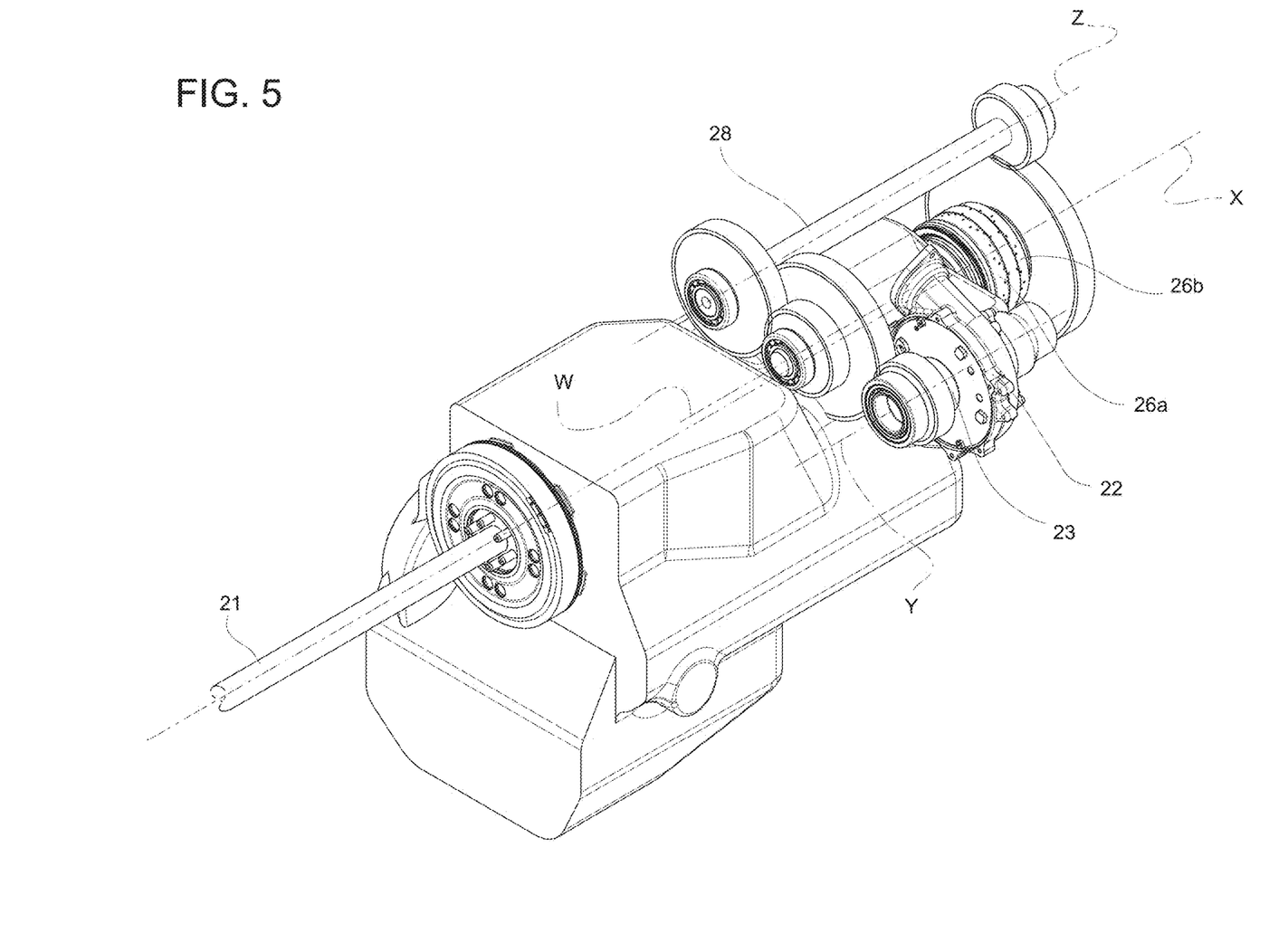
Figure 6:
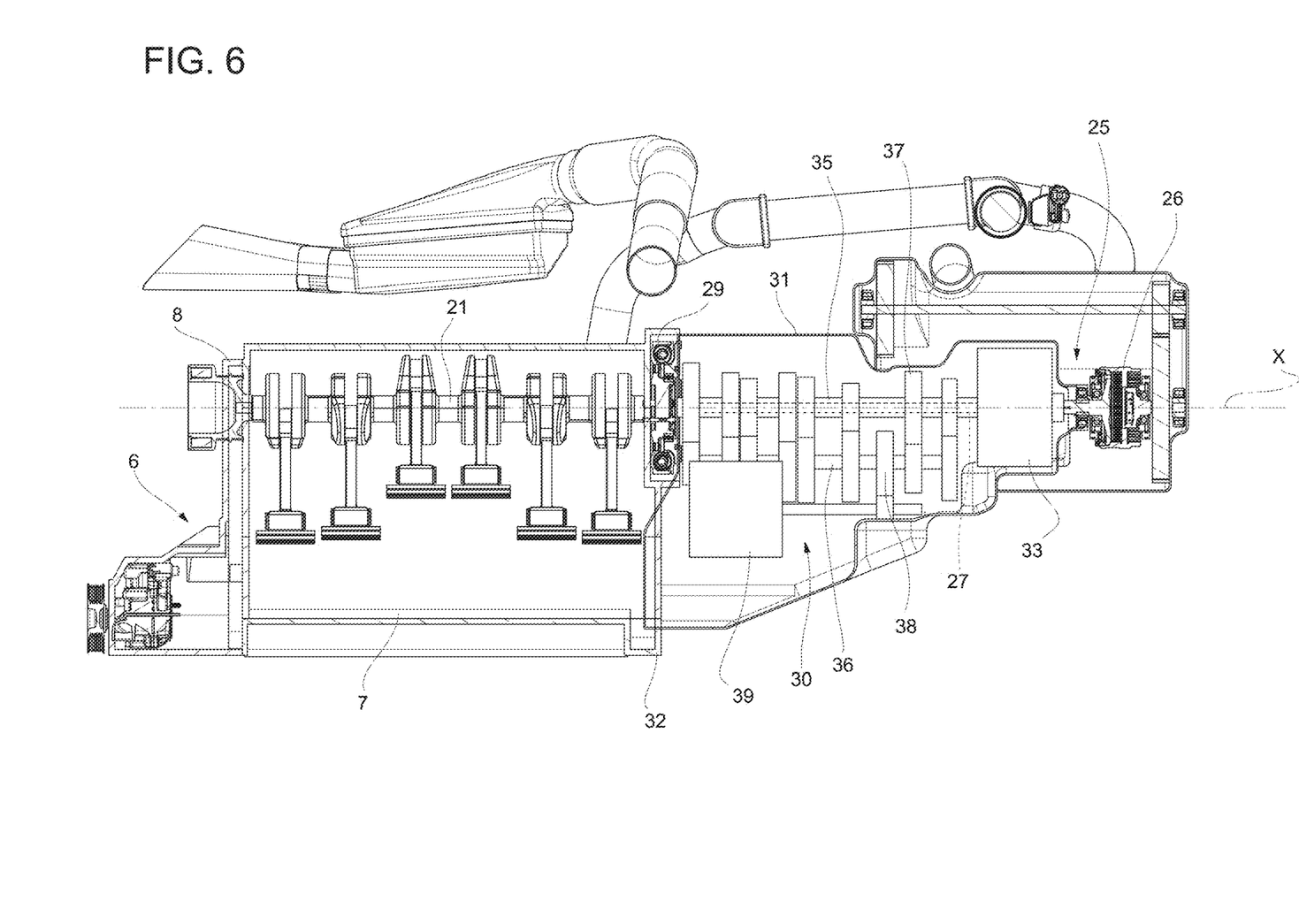
FIG. 6 is a section view, with parts removed for clarity and further parts schematized, of the propulsion assembly.

Another example of said movable members is the crankshaft 21, shown in FIG. 6. The crankshaft 21 is an example of a shaft of the engine 6 supported in a rotatable manner around its own axis of rotation. The axis of rotation of the crankshaft 21 is indicated in FIG. 5 by the symbol X. For example, the axis X is oriented in the direction of travel of the motor vehicle 1. Another example of a shaft that can form part of movable members of the engine 6 is a camshaft, known per sé in its function and therefore not described in detail nor illustrated.

In the following part of the description, the crankshaft 21 will be considered a specific example of a movable member of the engine 6, but said example can be replaced by any other known movable member of the engine 6, including a generic shaft rotatable around its own axis or the camshaft, more specifically, on condition that the movable member in question moves according to the power delivered by the engine 6 or in response thereto. In other words, the movable member moves in a manner corresponding to the power delivered by the engine 6 or alternatively the operating mode or operating speed of the engine 6.

Again alternatively, the movable member moves in a manner corresponding to the speed of the crankshaft 21, namely the speed at the output of the engine 6. In fact, it goes without saying that if the motion of the movable member depends on the power, said motion will inevitably depend also on the speed, since the power is a function of the speed and vice versa.

According to the invention, the intake line 19 comprises a further compressor 22, in turn comprising a compressor shaft 23 rotatable around its own axis Y, more specifically parallel to the axis X. The compressor 22 is configured or arranged to further compress the air compressed by the compressor 12 via rotation of the shaft 23. Preferably, the compressor 22 is a turbomachine. In other words, the compressor 22 functions by processing continuous flows of fluid. More specifically, the compressor 22 is a centrifugal radial compressor.

Furthermore, preferably, the compressor 22 is arranged above or higher than the cylinder head 7 and/or the engine 6, like the turbochargers 10 for example. In further detail, the compressor 22 comprises an intake for the air communicating with the outlet for the air of the compressor 12 via a portion 19a of the intake line 19, and an outlet for the air communicating with the intake manifold 15 via a portion 19b of the intake line 19. More specifically, the intake line 19 comprises a first branch 24a and a second branch 24b; the second branch 24b has or extends between two ends forming respective nodes with an equal number of ends of the first branch 24a. In particular, the nodes, namely the ends of the first branch 24a coinciding with the ends of the second branch 24b are coupling points of the first branch 24a with the portions 19a, 19b respectively.

The second branch 24b comprises the compressor 22. Therefore, in particular, the second branch 24b is formed of two respective sections of the portions 19a, 19b and the compressor 22 between the two sections, the sections extending respectively from the ends of the first branch 24a to two ports of the compressor 22, respectively defining an inlet and an outlet of the compressor 22.

In practice, the first branch 24a constitutes a bridge between the portions 19a, 19b, bypassing the compressor 22, namely a bypass branch of the compressor 22.

The first branch 24a comprises in turn a valve element 24c configured to obstruct a corresponding intermediate portion of the first branch 24a, thus blocking or preventing an air flow through the intermediate portion, effectively closing in particular the first branch 24a for passage of the air flow to the portion 19b. More specifically, the valve element 24c is a control valve, more precisely of the on-off type, namely a shut-off valve. In other words, the valve element 24c is controllable to carry out its function in a controlled manner. The ends of the first branch 24a straddle the intermediate portion that can be obstructed via the valve element 24c.

The second branch 24b is configured so as to bypass the intermediate portion, namely the valve element 24c, or more specifically the entire first branch 24a. In this way, the compressed air from the compressor 12 passes through the compressor 22 when the valve element 24c obstructs the relative intermediate portion. In fact, since the air cannot flow out on the portion 19b through the first branch 24a obstructed by the valve 24c, said air is obliged to travel through the second branch 24b, thus passing through the compressor 22.

Otherwise, when the valve 24c allows the air flow through the intermediate portion, the air compressed by the compressor 12 bypasses, at least partly, the compressor 22. Here, at least a part or more precisely the majority of the air compressed by the compressor 12, or possibly all the air compressed by the compressor 12, travels through the first branch 24a to flow out on the portion 19b towards the intake manifold 15.

In this scenario, namely with the first branch 24a open or not obstructed by the valve element 24c, the passage of the air into the second branch 24b including the compressor 22 would represent a pressure drop or in any case a path obstructed by the presence of the compressor 22 for the air compressed by the compressor 12. Therefore, the air flow preferentially passes through the first branch 24a towards the intake manifold 15, thus bypassing the compressor 22.

In this regard, upstream of the compressor 22, the branch 24b joins the branch 24a forming angles between 75° and 115° or more preferably angles of approximately 90°. Preferably, the intercooler 20 comprises the intermediate portion of the branch 24a. In other words, the air flow through the intermediate portion passes through the intercooler 20 and is therefore subject to an intermediate cooling via the intercooler 20. Even more preferably, the intercooler 20 comprises the entire branch 24a. In this case, the air flow through the branch 24a would cross the intercooler 20. This means that the intercooler 20 also comprises at least the ends of the branch 24b. More specifically, the branch 24b comprises sections that extend outside the intercooler 20.

Similarly, the branch 24b can comprise sections that extend through the intercooler 20, so as to be included by the latter. In any case, the air flow through the intake line 19 would pass through the intercooler 20 even if it completely bypassed the branch 24a.

The propulsion assembly also comprises a transmission group 25 configured to couple the movable member, in the particular example illustrated comprising the crankshaft 21, and the compressor shaft 23. In this way, the transmission group 25 is configured to determine a transmission of motion from the crankshaft 21 to the compressor shaft 23.

Here, more specifically, there is only one compressor 22 and a corresponding shaft 23; however, in general, the assembly could also comprise several compressors 22 in series or in parallel and respective shafts 23 all connected to the crankshaft 21 via the transmission group 25.

Conveniently, the transmission group 25 comprises a clutch device or more simply a clutch 26 controllable to selectively couple and decouple the crankshaft 21 to/from the compressor shaft 23.

The clutch 26 has at least two configurations, namely an engaged configuration, in which the clutch 6 couples the crankshaft 21 to the compressor shaft 23, and a disengaged configuration, in which the crankshaft 21 is decoupled from the compressor shaft 23. The clutch 26 can be controlled in its two positions in a selective manner. The clutch 26 comprises at least two clutch elements 26a, 26b, which are respectively engaged with and detached from each other when the clutch 26 is in the engaged and disengaged position.

Specifically, the clutch elements 26a, 26b are engaged with each other in the engaged position by friction, although this is not strictly necessary. For example, the elements 26a, 26b could engage with each other in a positive manner. For example, in this latter case, the clutch 26 could be a clutch of the tooth type.

Even more specifically, the clutch elements 26a, 26b are pressed against each other in the engaged position, such that the engagement pressure between the clutch elements 26a, 26b determines a limit on the torque that can be transmitted via the clutch 26, beyond which the elements 26a, 26b slide between each other causing a reduction in the torque transmitted and consequently in a torque transmission ratio through the clutch 26, namely more in general in a torque transmission ratio between the crankshaft 21 and the compressor shaft 23.

The sliding of the clutch elements 26a, 26b, namely more in general the sliding of the clutch 26, is controllable. Therefore, the torque transmission ratio is controllable via the sliding or the clutch 26.

For the sake of clarity, the torque transmission ratio can be understood for example as a ratio between the torque on the element 26a and the torque on the element 26b. The torque transmission ratio has an affinity or a correspondence with the speed transmission ratio, which can be understood, for example, as a ratio between the rotation speed of the elements 26a, 26b. Therefore, the concept of torque transmission ratio could be substituted by the concept of speed transmission ratio.

Going into further detail in the composition of the transmission group 25, the latter comprises a drive shaft 27 coupled to the crankshaft 21 so as to rotate around its own axis, more specifically coinciding with the axis X or parallel to the axis X, as a function of the rotation of the crankshaft 21, for example according to a transmission ratio that can be constant or variable, for example in a linear or non-linear manner. In this case, the shaft 27 is fixed relative to the crankshaft 21. In particular, the engine 6 comprises a flywheel 29 fitted on the crankshaft 21; the flywheel 29 is in turn fixed relative to the shaft 27.

Furthermore, the element 26a is rotationally fixed to the shaft 27. Furthermore, the transmission group 25 comprises a gear train 28 configured to transmit the rotation of the element 26b to the compressor shaft 23. More specifically, the gear train 28 is an ordinary gear train, in particular with a plurality of speed reduction stages, more in particular having a number greater than or equal to three. Even more specifically, the gear train 28 is an ordinary gear train with parallel axes. In addition to the axes X, Y, FIG. 5 shows another two axes Z, W of the gear train 28. The axes Z, W, are parallel to the axes X, Y. Preferably, the elements 26a, 26b are coaxial with the drive shaft 27. Expediently, at least a portion of the gear train 28 or all the gear train 28 is located above the engine 6.

In the embodiment illustrated in FIG. 6, the propulsion assembly comprises a gearbox 30 having an outer casing 31 fixed to an outer casing 32 of the engine 6. The casing 31 extends according to the axis X, in particular protruding with respect to the casing 32 along the axis X.

The drive shaft 27 extends through the casing 31, in particular until it comes out of the casing 31, protruding along the axis X from the latter. In fact, the clutch 26 is preferably arranged outside the casing 31.

The gearbox 30 preferably comprises at least one connection device, namely in this case a clutch device 33 or more simply a clutch 33, for example of single or double type (namely of the dual clutch type), configured to mechanically connect to the drive shaft 27 so as to receive motion at the inlet from the drive shaft 27. More precisely, the gearbox 30 comprises at least a primary shaft 35 and a secondary shaft 36. The clutch device 33 is configured to transmit the motion of the drive shaft 27 to the primary shaft 35 when the gearbox 30 is mechanically connected to the drive shaft 27 via the clutch device 33. The clutch device 33 has a function known per se; the construction details thereof can be of various types and are therefore omitted for the sake of brevity.

The primary shaft 35 carries a plurality of gear wheels 37, likewise the secondary shaft 36 carries a further plurality of gear wheels 38 respectively meshing with the wheels 37 to form the gears of the gearbox 30, as known in the field. The secondary shaft 36 provides motion at the inlet to an automotive differential 39, of known type and illustrated schematically in FIG. 6. The clutches 26, 33 are arranged so as to be couplable to the drive shaft 27 according to a configuration in parallel. Therefore, the mechanical transmission group 25 is configured to transmit motion from the crankshaft 21 to the compressor shaft 23 bypassing the gearbox 30, independently of whether the latter is connected to the drive shaft 27 via the clutch device 33.

As already mentioned, the transmission group 25 comprises at least one transmission device controllable to adjust the torque transmission ratio between the crankshaft 21 and the compressor shaft 23. Specifically, the transmission device comprises the clutch 26, the sliding of which is controllable to adjust the torque transmission ratio, as explained above.

Alternatively or additionally, the transmission device could comprise a gearbox, for example, with the consequent possibility of choosing between a plurality of available torque transmission ratios. In fact, the gearbox is here understood as a device that allows a plurality of gear changes and therefore a choice of torque transmission ratio. Furthermore, the propulsion assembly preferably comprises a control unit ECU configured to control the transmission device, namely the clutch 26.

In further detail, the control unit ECU controls the transmission device by controlling the torque transmission ratio as a function of one or more control quantities of the engine 6. For example, the control quantities of the engine 6 can include the current output torque from the engine 6 and a desired torque for the output torque from the engine 6.

According to one example, the control unit ECU is configured to control the transmission device, specifically the clutch 26, more specifically an arrangement thereof in the engaged position or in the disengaged position, namely a sliding thereof in the engaged position, according to a control law adapted to minimize a difference between the desired torque and the current output torque. In particular, the control law can be any closed loop control law, for example a proportional, proportional-integral or proportional-integral-derivative (PID) control law, or a modern control law in the state space. Alternatively, the control law could even be an open loop control law, without any loss of generality.

According to another example, the control unit ECU is configured to control the torque transmission ratio as a solution of an optimal control problem.

The solution of the optimal control problem is defined in particular by the maximization or minimization of an objective function in which, more in particular, the control quantities of the engine 6 are comprised. For example, the objective function can correspond to the consumption of the motor vehicle 1, so that the solution to the problem is minimization of the objective function. Alternatively, the objective function can generically correspond to a performance index of the motor vehicle 1, so that the solution of the problem is maximization of the objective function.

Actually, the sliding of the clutch 26 or the movement of the clutch 26 between the engaged position and the disengaged position (possibly, the engaged position and the disengaged position can be considered equivalently as a position with sliding between null and total and a position with total sliding, respectively) clearly influences operation of the engine 6 and the motor vehicle 1.

In fact, the sliding of the clutch 26 can determine the torque on the compressor shaft 23 and consequently the pressure of the air taken in by the engine 6.

For example, when the engine 6 operates at minimum speed, the exhaust gases have a relatively low enthalpy, and therefore the turbochargers 10 compress the air very little. However, the air pressure can be increased via the compressor 22 according to the sliding of the clutch 26. Preferably, the control unit ECU is configured to control also the valve element 24c. In particular, the control unit ECU is configured to control the valve element 24c so as to obstruct the intermediate portion of the branch 24a when it sets or maintains the clutch 26 to/in the engaged position.

Vice versa, although independently, the control unit ECU is also configured to control the valve element 24c so as to free the passage of the air flow through the intermediate portion when it sets or maintains the clutch 26 to/in the disengaged position. From the above, the advantages of the motor vehicle 1 and the process according to the invention are evident. In particular, when the revolutions of the engine 6 are low, the efficiency of the supercharging remains high since the engine 6 supplies the compressor 22, compressing to a greater extent the air compressed by the compressor 12.

On the other hand, when the revolutions of the engine 6 are high, the overpressure produced by the compressor 22 becomes unnecessary, hence the clutch 26 can be set to the disengaged position. The valve element 24c ceases to obstruct the branch 24a, so that the compressor 22 is bypassed.

Lastly it is clear that modifications and variations that do not depart from the protective scope defined by the claims can be made to the supercharger device according to the invention. In particular, each of the devices shown schematically in the figures is independent of the other details and is specifically conceived to solve specific technical problems in isolation from the other details.

The invention claimed is:

1. A propulsion assembly for a motor vehicle, the propulsion assembly comprising:
an internal combustion engine comprising at least one movable member as a function of an operating speed of said engine;
a turbocharger comprising a turbine adapted to expand exhaust gases of said engine to generate work and a first compressor adapted to compress air by means of the work generated by the turbine;
an intake line connecting an outlet of the first compressor to an intake manifold of said engine to supply compressed air from the first compressor to said engine;
wherein the intake line comprises a second compressor, wherein the second compressor comprises a compressor shaft rotatable about a first axis and is configured to further compress the compressed air from the first compressor via a rotation of the compressor shaft,
wherein the propulsion assembly further comprises a mechanical transmission means configured to couple the movable member to the compressor shaft, thereby determining a transmission of motion from the movable member to the compressor shaft,
wherein the movable member comprises a crankshaft rotatable about a second axis,
wherein the propulsion assembly further comprises a gearbox having a first outer casing attached to a second outer casing of said engine and extending along the second axis, wherein the mechanical transmission means comprise a drive shaft coupled to the crankshaft and extending through the first outer casing along a further axis parallel to the second axis, and
wherein the gearbox comprises at least one linkage device for mechanically connecting with the drive shaft so as to receive input motion from the drive shaft, the mechanical transmission means being configured to transmit motion from the crankshaft to the compressor shaft bypassing a drive gear train of the gearbox configured to propel the motor vehicle.

2. The propulsion assembly according to claim 1, wherein the mechanical transmission means comprise a controllable clutch device for selectively coupling and decoupling the movable member to/from the compressor shaft.

3. The propulsion assembly according to claim 1, wherein the mechanical transmission means comprise a transmission device controllable to adjust a torque or speed transmission ratio between the movable member and the compressor shaft.

4. The propulsion assembly according to claim 3, further comprising a control unit configured to control the transmission device by controlling the torque or speed transmission ratio as a function of one or more control quantities of said engine.

5. The propulsion assembly according to claim 4, wherein the control unit is configured to control the torque or speed transmission ratio as a solution of an optimal control problem, the solution being defined by minimization or maximization of an objective function.

6. The propulsion assembly according to claim 3, wherein the transmission device comprises an additional gearbox and/or a clutch.

7. The propulsion assembly according to claim 1, wherein the second compressor is a turbomachine.

8. A motor vehicle comprising the propulsion assembly according to claim 1, wherein said engine has a cylinder head facing downward and a crankcase arranged above the cylinder head.

9. The motor vehicle according to claim 8, wherein the second compressor is arranged higher than the cylinder head.

10. A propulsion assembly for a motor vehicle, the propulsion assembly comprising:
- an internal combustion engine comprising at least one movable member as a function of an operating speed of said engine;
- a turbocharger comprising a turbine adapted to expand exhaust gases of said engine to generate work and a first compressor adapted to compress air by means of the work generated by the turbine;
- an intake line connecting an outlet of the first compressor to an intake manifold of said engine to supply compressed air from the first compressor to said engine;
- wherein the intake line comprises a second compressor, wherein the second compressor comprises a compressor shaft rotatable about an axis and is configured to further compress the compressed air from the first compressor via a rotation of the compressor shaft,
- wherein the propulsion assembly further comprises a mechanical transmission means configured to couple the movable member to the compressor shaft, thereby determining a transmission of motion from the movable member to the compressor shaft,
- wherein the intake line comprises a first branch, the first branch comprising a valve member configured to obstruct an intermediate portion of the first branch, thereby blocking an air flow through said intermediate portion, and a second branch having two ends at respective ends of the first branch straddling said intermediate portion, thus bypassing said intermediate portion, the second branch further comprising the second compressor, such that the air compressed by the first compressor passes through the second compressor when the valve element obstructs said intermediate portion, and bypasses the second compressor when air flow is permitted through said intermediate portion, and
- wherein the intake line comprises an intercooler comprising said intermediate portion.

11. The propulsion assembly according to claim 10, wherein the intercooler comprises the entire first branch.

12. The propulsion assembly according to claim 10, wherein said intermediate portion is at an intermediate zone of the intercooler.

13. A motor vehicle comprising the assembly according to claim 10, wherein said engine has a cylinder head facing downward and a crankcase arranged above the cylinder head.

14. The motor vehicle according to claim 13, wherein the second compressor is arranged higher than the cylinder head.

* * * * *